Figure 11:
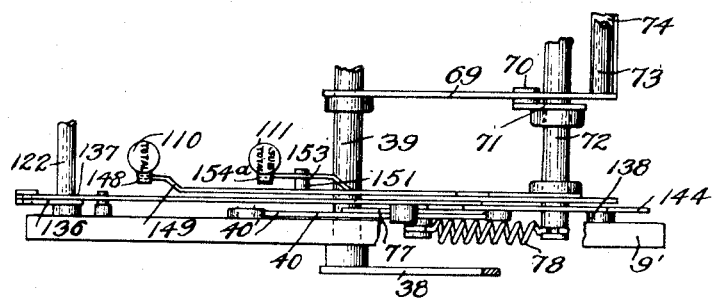

N. WHITE.
ADDING AND LISTING MACHINE.
APPLICATION FILED MAR. 20, 1913.
1,192,721.
Patented July 25, 1916.
10 SHEETS—SHEET 1.
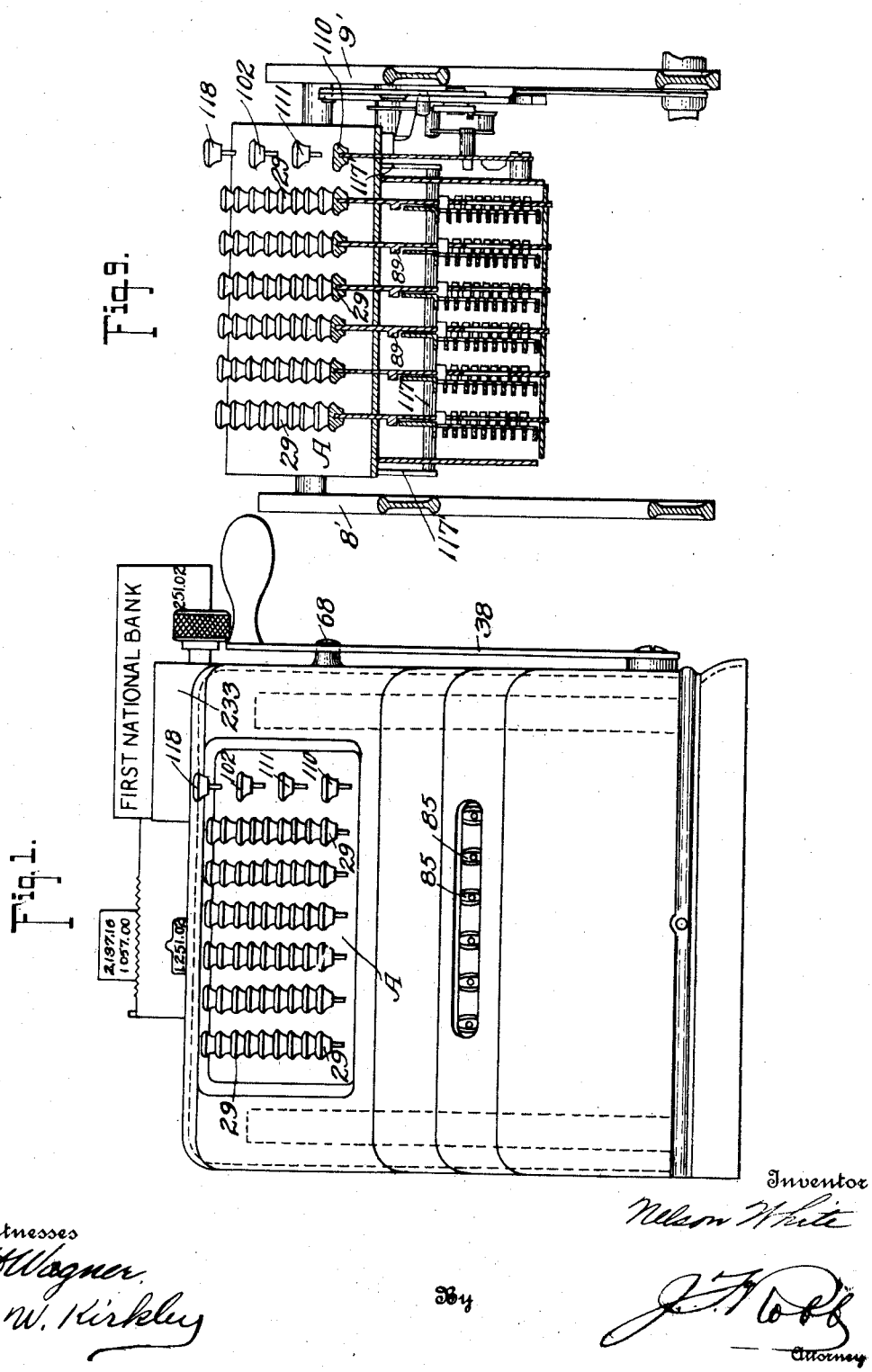
Witnesses
C. H. Wagner
G. W. Kirkley
Inventor
Nelson White
By J. F. Cobb
Attorney N. WHITE.
ADDING AND LISTING MACHINE.
APPLICATION FILED MAR. 20, 1913.
1,192,721.
Patented July 25, 1916.
10 SHEETS—SHEET 2.
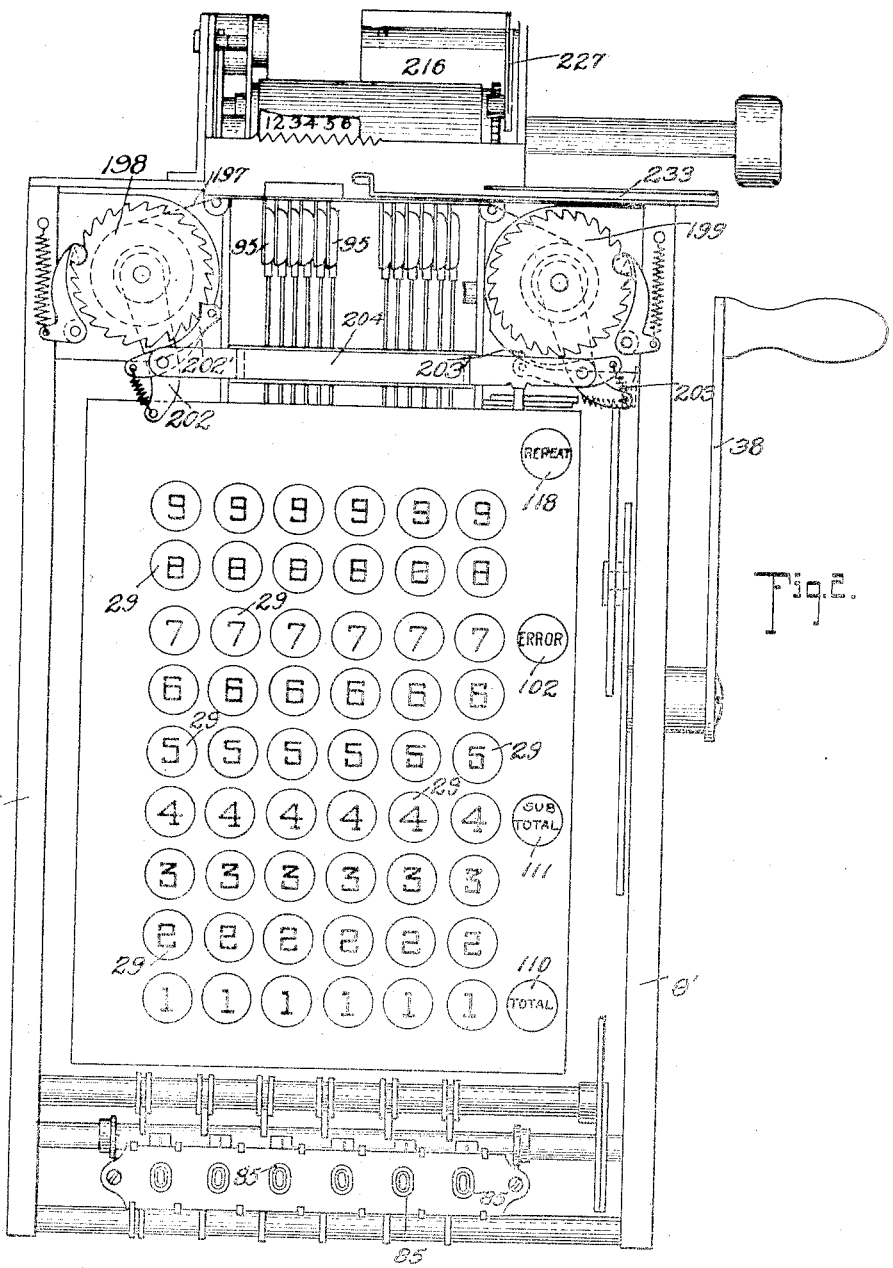

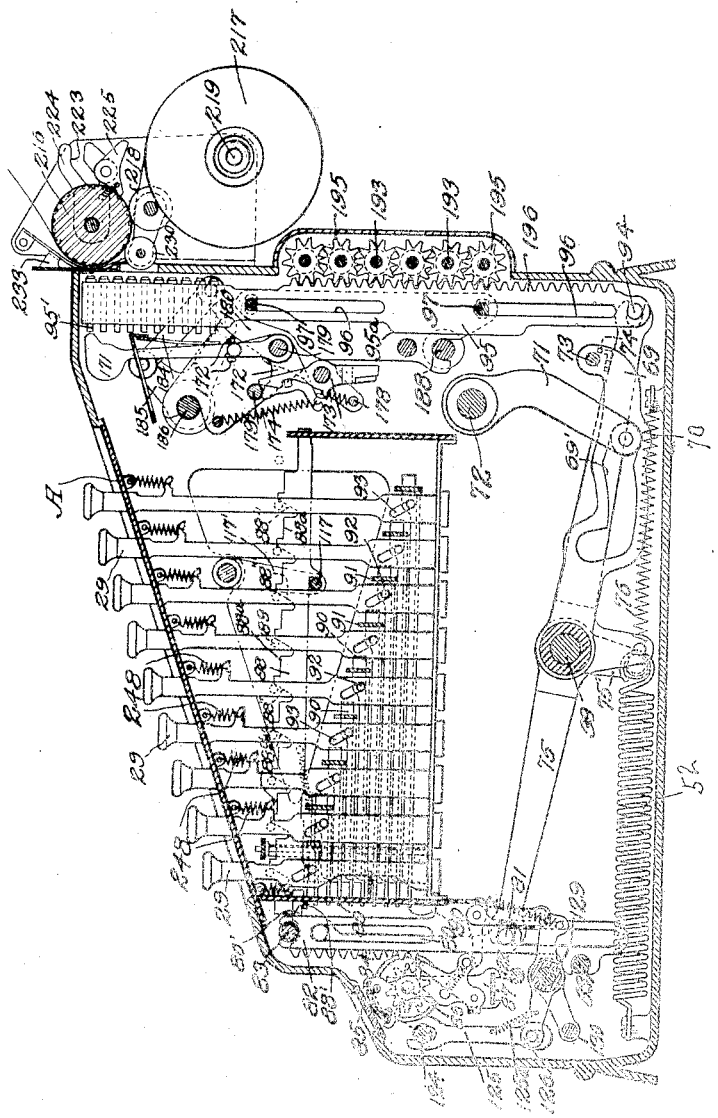

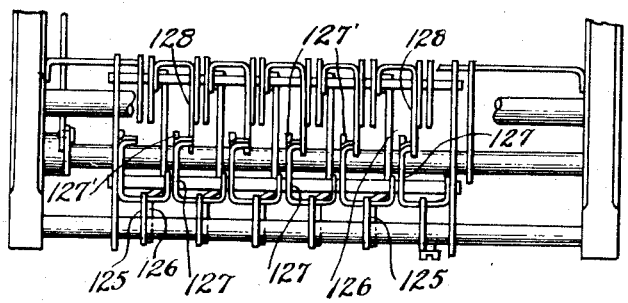
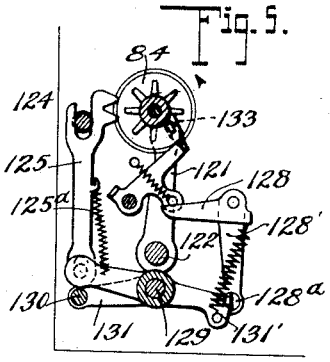
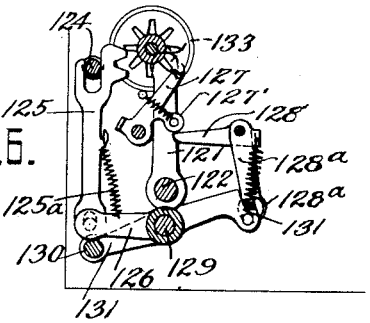
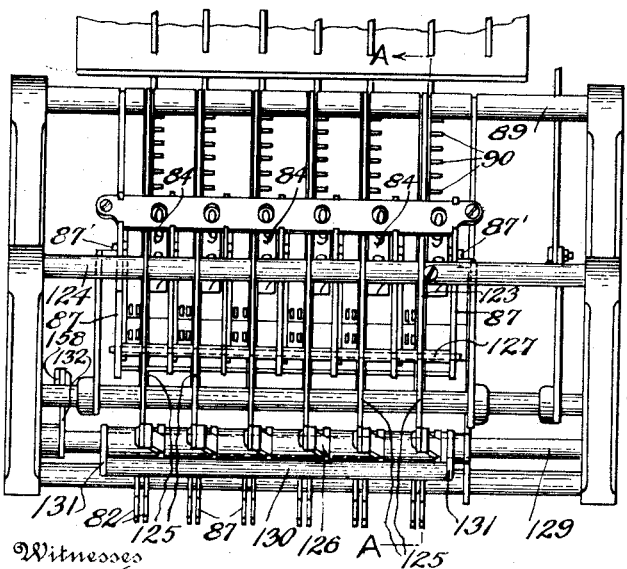
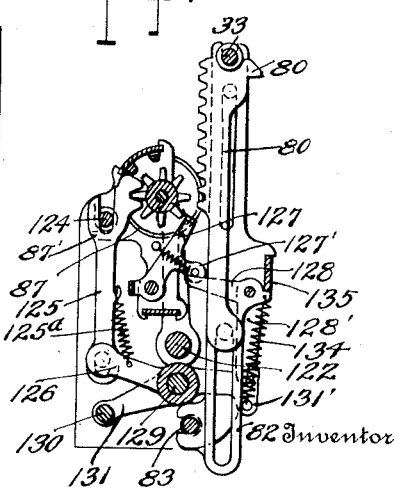

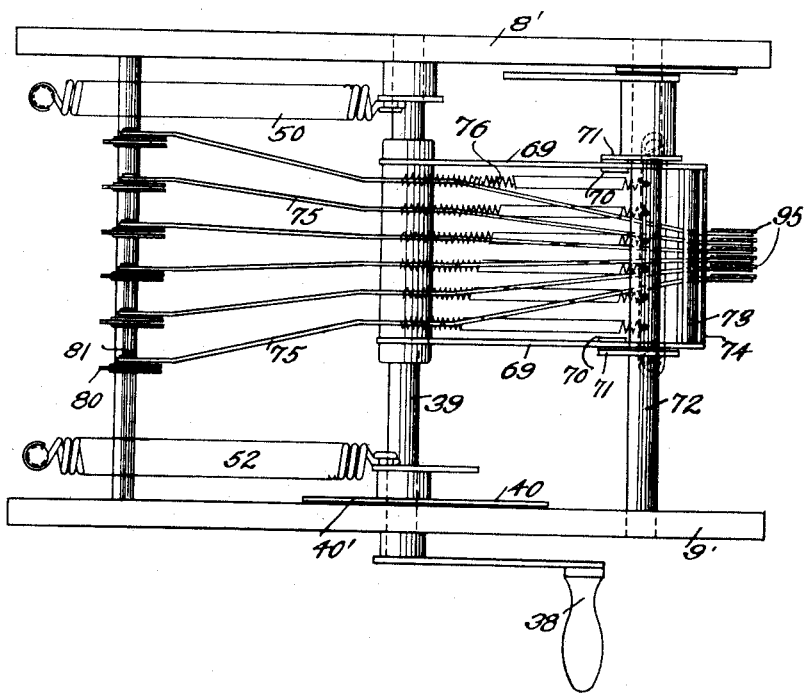

N. WHITE.
ADDING AND LISTING MACHINE.
APPLICATION FILED MAR. 20, 1913.

1,192,721.

Patented July 25, 1916.
10 SHEETS—SHEET 6.

Witnesses
C. H. Wagner.
J. W. Kirkley

Inventor
Nelson White

By J. F. Robb
Attorney

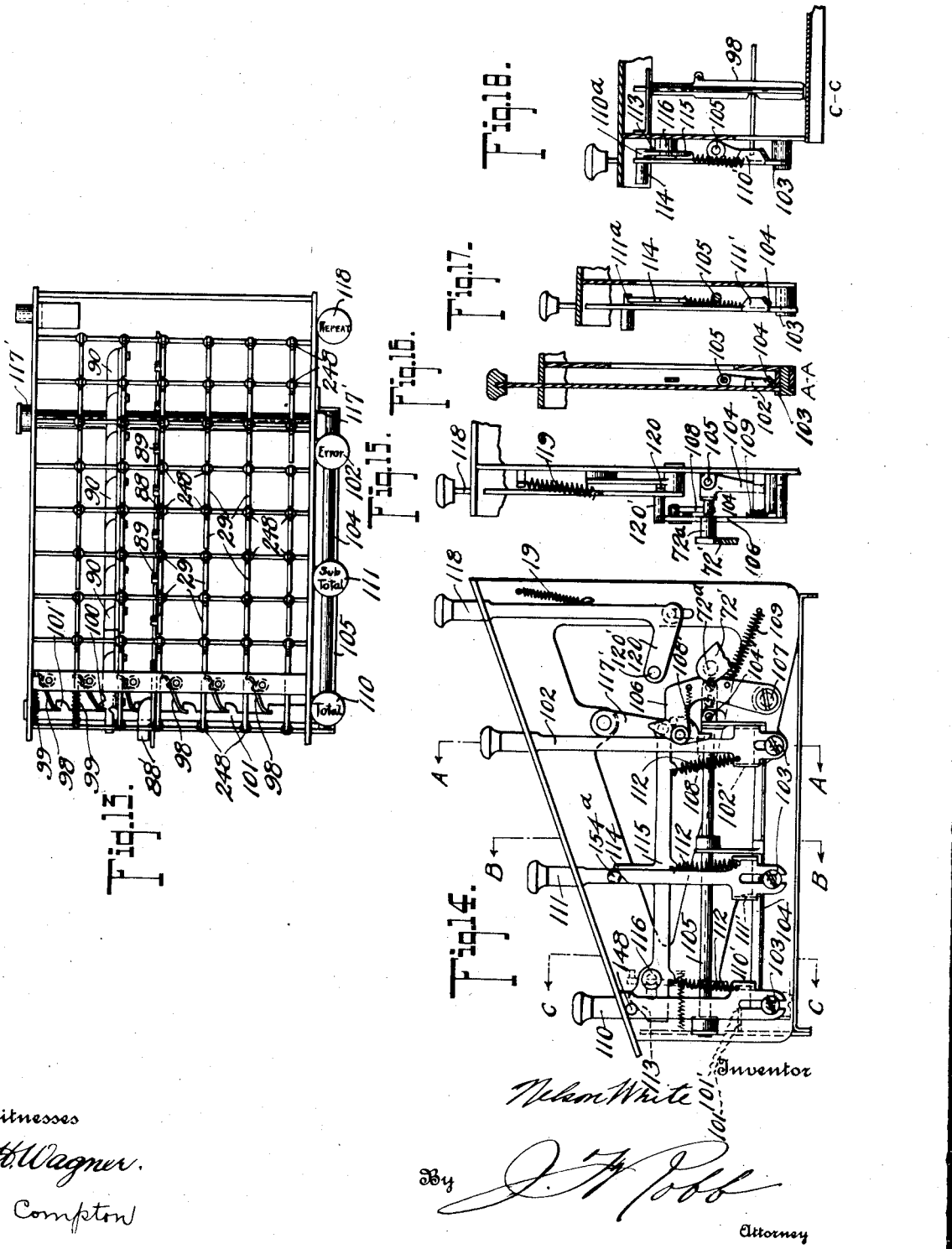

N. WHITE.
ADDING AND LISTING MACHINE.
APPLICATION FILED MAR. 20, 1913.
1,192,721.
Patented July 25, 1916.
10 SHEETS—SHEET 8.
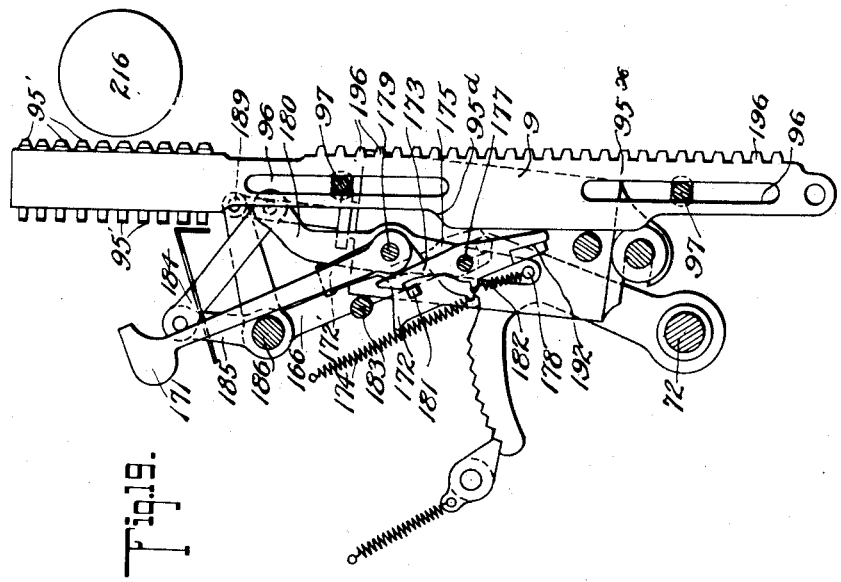
Fig. 19.
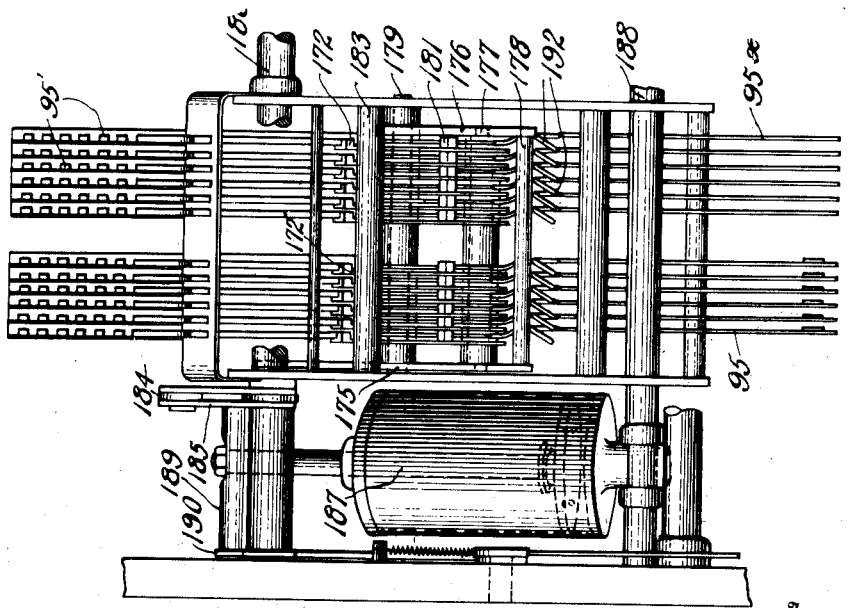
Fig. 20.
Witnesses
C. H. Wagner,
L. Compton
Inventor
Nelson White
By 
Attorney N. WHITE.
ADDING AND LISTING MACHINE.
APPLICATION FILED MAR. 20, 1913.
1,192,721.
Patented July 25, 1916.
10 SHEETS—SHEET 9.
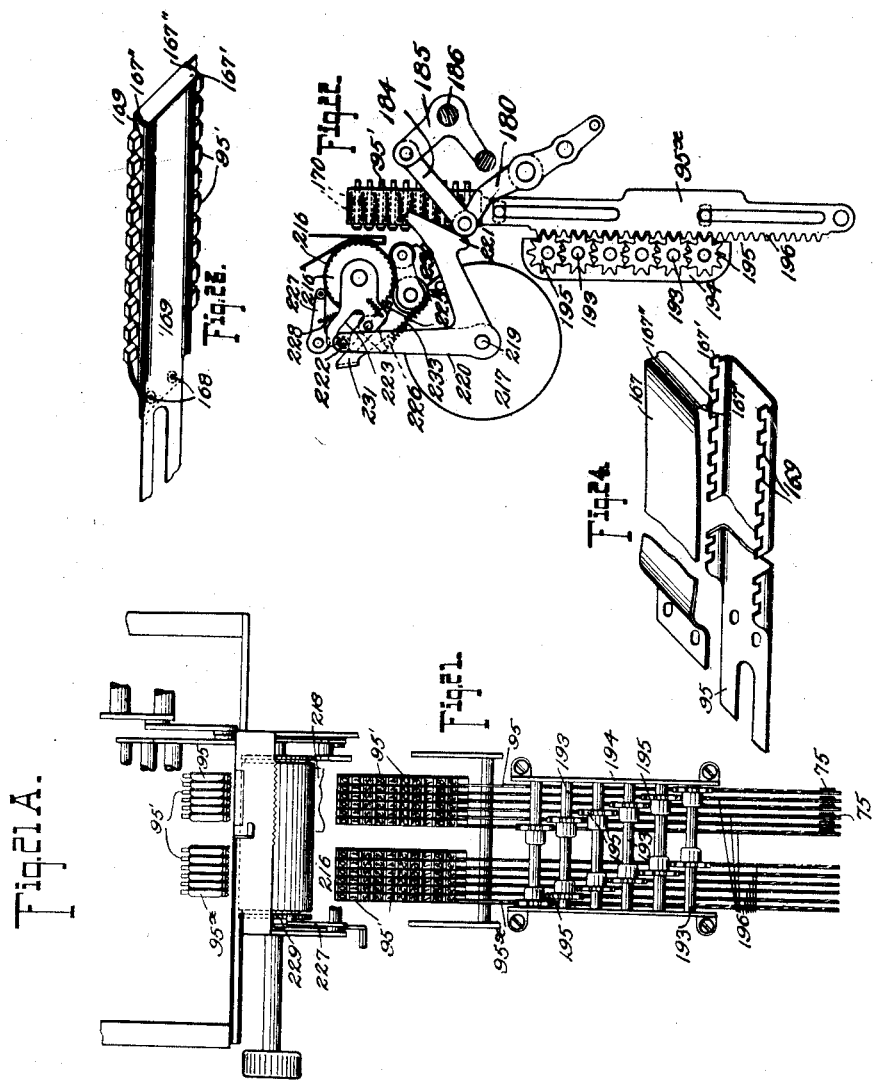
Witnesses
C. H. Wagner.
G. W. Kirkley.
Inventor
Nelson White
By J. F. Robb
Attorney

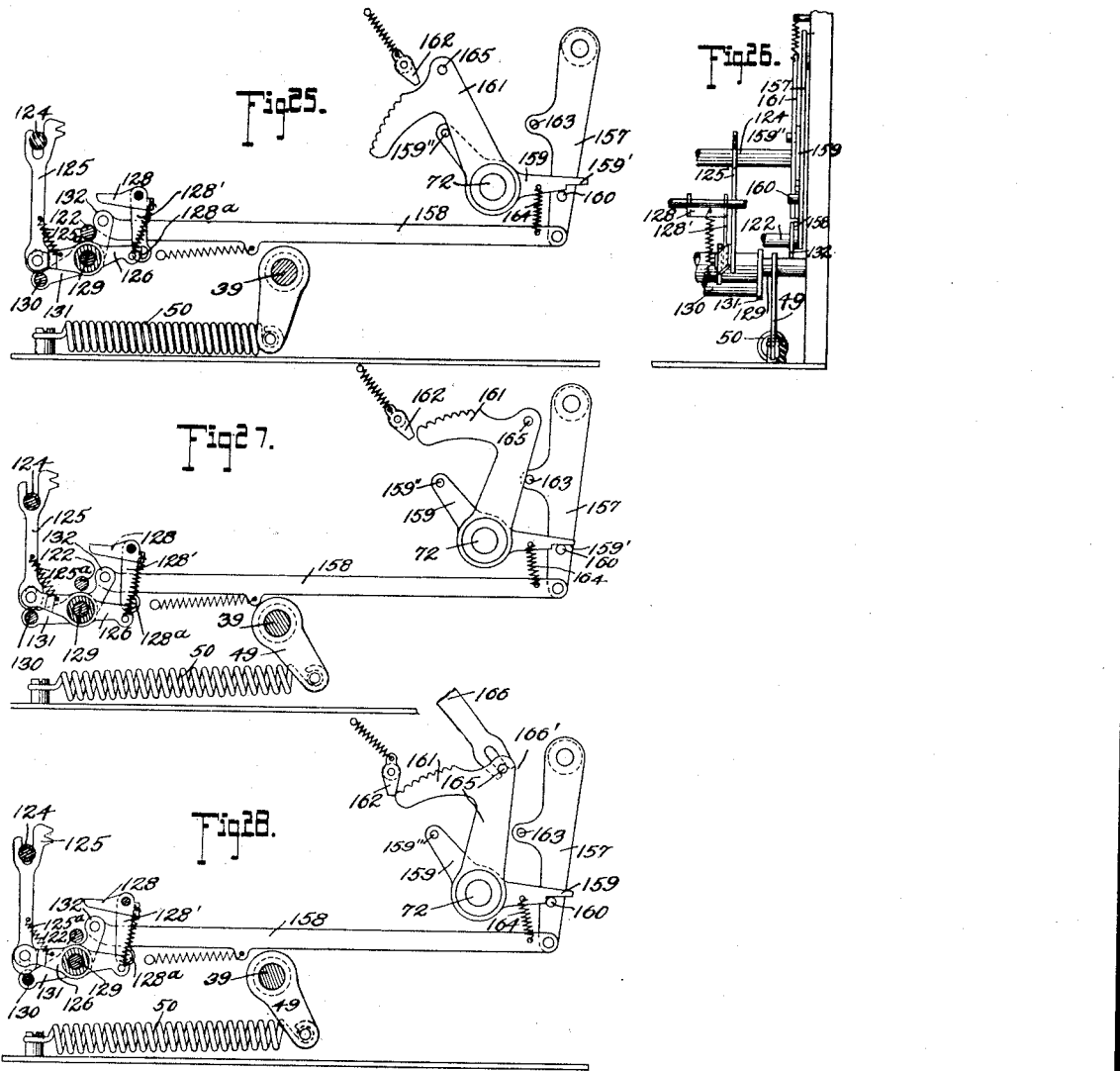

UNITED STATES PATENT OFFICE.

NELSON WHITE, OF PORTLAND, OREGON, ASSIGNOR, BY MESNE ASSIGNMENTS, TO INTERNATIONAL MONEY MACHINE COMPANY, OF TERRE HAUTE, INDIANA, A CORPORATION OF INDIANA.

ADDING AND LISTING MACHINE.

1,192,721.  Specification of Letters Patent.  Patented July 25, 1916.

Application filed March 20, 1913.  Serial No. 755,817.

*To all whom it may concern:*

Be it known that I, NELSON WHITE, a citizen of the United States, residing at Portland, in the county of Multnomah and State of Oregon, have invented certain new and useful Improvements in Adding and Listing Machines, of which the following is a specification.

The present invention appertains to adding or calculating machines and embodies improvements in the keyboard mechanism of such machines including particularly the arrangement and construction of the amount keys, the indexing devices commonly used to coöperate with such keys, the instrumentalities establishing coöperation between said indexing devices and the accumulating mechanism, the controlling means establishing coöperation between the total, sub-total, error and repeat keys, with relation to the amount keys and the adjacent coöperative indexing members.

The invention involves also the specific controlling mechanism between the main actuator or handle and the accumulating mechanism whereby the total and sub-total keys may govern the action of the latter mechanism for the taking of totals and sub-totals for well known purposes in machines of this type.

The invention also involves certain detail features of construction of the instrumentalities controlling the action of the transfer devices forming a part of the accumulating mechanism.

The invention covers the general mechanisms above referred to as they may be used collectively, and as susceptible of separate use under certain conditions, together with other several details of construction and operation, all of which will be more fully understood upon reference to the following description and to the accompanying drawings, in the latter of which—

Figure 12:
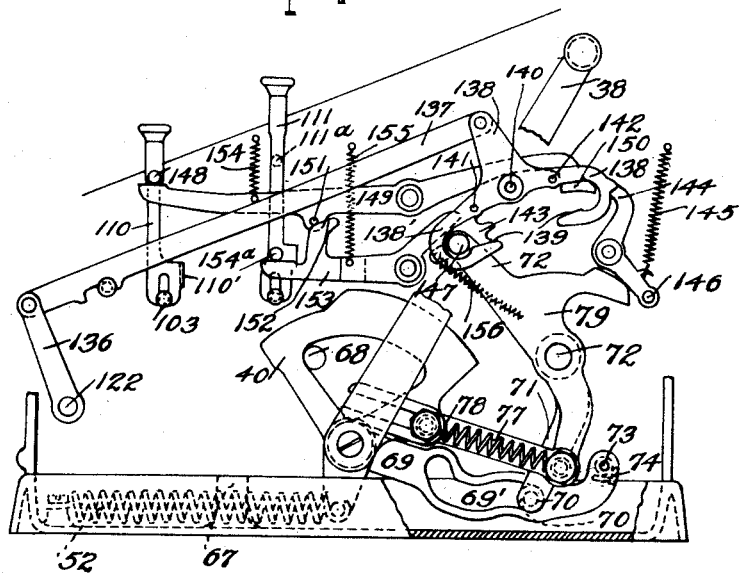

Figure 1 is a front view of an adding and listing machine embodying the invention. Fig. 2 is a top plan view of the machine, certain portions of the casing being omitted to bring out the general arrangement of interior parts. Fig. 3 is a vertical sectional view bringing out clearly the general arrangement of all of the various mechanisms. Fig. 4 is a plan view of parts of the machine frame adjacent to the adding devices, and illustrating more particularly the coöperation of the carry-over and totaling pawls with the latches controlling the operation of the carry-over racks. Fig. 5 is a sectional diagrammatic view of the transfer or carry-over mechanism in the act of tripping the adding wheels into mesh with the adding racks, the transfer being delayed. Fig. 6 is a view similar to Fig. 5, showing the completion of the transfer or carry-over. Fig. 7 illustrates the parts of the accumulating mechanism in their normal position, the view being a section approximately on the line A—A of Fig. 8. Fig. 8 is a view of the machine with the front casing plate removed, showing the adding mechanism and parts of the indexing devices. Fig. 9 is a vertical sectional view taken at a right angle to the section illustrated in Fig. 3, certain parts omitted but the general arrangement of the keys and indexing parts being most clearly shown. Fig. 10 is a partial top plan and sectional view taken horizontally through the machine to bring out the lever connections between the adding racks and type carriers. Fig. 11 is a fragmentary top plan view bringing out more clearly the control mechanism and main actuator. Fig. 12 is an elevation of the parts shown in Fig. 11. Fig. 13 is a top plan view of certain parts of the indexing mechanism, showing the key release means and general arrangement of the special keys. Fig. 14 is a view showing in elevation the special keys and associated operating mechanism, as well as certain key release devices. Fig. 15 is a view looking forwardly toward the "Repeat" key and illustrating certain parts shown in Fig. 14. Fig. 16 is a sectional view taken approximately on the line A—A of Fig. 14. Fig. 17 is a sectional view taken approximately on the line B—B of Fig. 14. Fig. 18 is a sectional view taken approximately on the line C—C of Fig. 14. Fig. 19 is a side elevation of the listing or printing mechanism. Fig. 20 is a front view of the parts shown in Fig. 19, the frame of the machine being broken away, and certain parts such as springs omitted. Fig. 21 is a rear view of the parts shown in Figs. 24 and 25. Fig. 21ᴬ is a fragmentary top plan view showing more clearly certain of the parts illustrated in Fig. 22. Fig. 22 is a view of the printing mechanism looking toward the left hand side of the machine and bringing out clearly the means for feeding the platen forward. Figs. 23 and 24 are detail perspective views of one of the type carriers showing the manner of joining the composite parts thereof. Fig. 25 is a partial section and side elevation of the carry-over control mechanism. Fig. 26 is a rear view of the parts shown in Fig. 25. Figs. 27 and 28 are views similar to Fig. 25 but showing the parts arranged at different stages in their operation.

Referring to the drawings, the numerals 8' and 9' designate the sides, or frames of the machine, a suitable casing being provided in connection with said frame members to house the several mechanisms, as customary. The key-board A of the machine is quite clearly illustrated in Figs. 1, 2, 3 and 9, and this key-board comprises a bank of keys 29 consisting of a number of rows, keys of each row being numbered from 1 to 9, consecutively. The capacity of the machine illustrated is 9999.99, any amounts from 1 up to that above stated being adapted to be added and listed by the operation of the machine. Simply by adding additional rows of keys, the capacity may be increased and certain special keys, designated "Repeat," "Error," "Sub-total," and "Total" are provided as usual.

*Main Actuator.*—In Figs. 1, 2 and 10, the main actuator is illustrated in the form of a handle 38 mounted upon a main operating shaft 39 journaled in the frames 8' and 9'. On the shaft 39 is rigidly carried a segment 40, (see Fig. 12) the forward extremity of which is adapted to abut with a stop lug 67 on the base of the machine to limit the forward movement of the handle, rearward movement of said handle being limited by a lug 68 which projects outwardly from the side of the machine.

*Indexing means for adding and listing mechanisms.*—Figs. 3, 9 and 13 show most clearly the indexing devices operable by the keys 29 to control the differential adjustment of the adding and printing instrumentalities, whereby to add and list, respectively, the amounts equivalent to the numbers on said keys. The adding and listing mechanism is of the general type comprising adding wheels adapted to be operated by reciprocating adding racks, the latter being connected with type carriers and the movement of said racks and type carriers being differentially controlled by the keys 29, as above suggested. The springs 50 and 52 tend to hold the handle 38 normally at its rear position and on the shaft 39 are loosely mounted a pair of arms 69 having crooked cam slots 69'. In the slots 69' operate rollers 70 carried by the lower ends of depending arms 71, which are rigidly secured at their upper ends to a drive shaft 72 supported parallel with respect to the shaft 39, and mounted in bearings in the frame members 8' and 9'. A tie rod 73 and detent bar 74 connect the arms 69, and said bar 74 is normally maintained in such a position that it holds depressed, as shown in Figs. 3 and 10, the rear ends of a plurality of levers 75. The levers 75 are loosely pivoted intermediate their ends upon the shaft 39, and said levers converge toward their rear ends and diverge toward their front ends, see Fig. 10. Springs 76 are anchored at one end to the base of the machine and at their opposite or front ends, they are secured to the arms 75' of the levers 75 and are normally under tension to raise the rear end portions of said arms. The levers 75 are maintained in the positions shown in Fig. 3, while the machine is at rest, by means of the detent bar 74. A flexible link connection comprising the parts 77 and 78, the latter a spring, is provided intermediate the segment 40 and a lever 79, which is also carried by the shaft 72 aforesaid.

From the foregoing it will be apparent that on forward movement of the handle 38 a rearward movement will be transmitted to the lever 79 through the flexible connection 77, 78, said lever turning with the shaft 72. The movement of the shaft 72 causes the arms 71 thereof to move toward the front of the machine and the rollers 70 operate in the slots 69' of the arms 69 so as to raise these arms and correspondingly lift the transverse members 73 and 74 which, with the arms 69 virtually form a detent bail holding the various levers 75 in their normal position as shown in Fig. 3. When the members 73 and 74 have been lifted in the manner set forth it will be apparent that the levers 75 are caused to tilt on the shaft 39, under the action of the springs 76 connected with each of said levers. The extent of movement of the levers 75 will of course depend upon the position of the adjusted index stop 90 coöperative with the adding rack with which the particular lever is connected. The tilting of the levers 75 downwardly at their front ends carries the adding racks connected thereto downwardly if said racks have been released from the locking bars 88, and simultaneously, of course, the type carriers 95 are elevated through the upward movement of the rear ends of the levers 75.

At their front ends, the several levers 75 are provided with forked portions engaging the lowermost of lateral studs 81 on the adding racks 80. The racks 80 are vertically arranged and each rack is mounted to move between a pair of supporting guide plates 82 suitably secured in position on cross rods 83 of the framework. The plates 82 are vertically slotted to receive the studs 81 and insure proper vertical movement of the racks in relation to the adding pinions or wheels 84, with which the racks are adapted to be engaged.

The adding wheels or pinions 84 are located below a sight opening 85 in the front of the casing of the machine and are mounted on a shaft 86 carried by an accumulator frame 87. Normally the adding wheels are not in engagement with the racks 80 but the frame 87 is capable of being shifted or rocked in order to move the adding pinions or wheels 84 into and out of engagement with said racks 80 in a manner to be set forth clearly hereinafter in the detailed description of the adding mechanism.

The racks 80 are stationary at their uppermost positions when the machine is at rest, being held in such positions by engagement of lugs 80' thereon with flanges 88' of locking bars 88. One locking bar 88 is provided for each series or row of keys 29, and said bar is formed with cams 88'' engageable by lateral pins 89 on the lower ends of the keys 29. For each series or row of keys 29, there is provided a series of index stops 90, which comprise a plurality of superposed sliding plates movable horizontally in guide openings or slots provided in supporting strips or guides 91 suitably attached at their ends to the frame members 8' and 9' and arranged transversely with respect to said stops 90. Each index stop 90 has near its rear end a lateral pin 92 entering an inclined cam slot 93 of a coöperating amount key 29, said slot being so disposed that, on depression of a key 29, the index stop 90 of the latter will be moved longitudinally forward into the path of the lug 80' of the adjacent rack. The said depression of the key, of course, forces the coacting locking bar 88 rearwardly, by the coöperation of the pin 89 with a cam 88'', and this action effects a release of the adding rack 80 from the locking flange 88', whereby to permit the adding rack to descend at the proper time and engage with the selected and now operative index stop. At their rear ends, the levers 75 are also formed so as to engage with studs 94 provided at the lower extremities of type carriers 95, the latter consisting of vertical reciprocatory bars formed with longitudinal slots 96 through which supporting and guide rods 97 pass. At their upper ends, the type carriers 95 are supplied with the various types which are used to print amounts in accordance with those registered or added by means of the amount keys, suitable impression hammers coacting with the types of each type carrier to accomplish the desired result. The general coöperation between the actuator or handle 38, the keys 29, indexing stops, adding and printing means will now be set forth.

When the operator desires to add and list a certain amount, those of the various keys 29 representing said amount are depressed. If a key 29 of each series or row is depressed, all of the locking bars 88 will be moved rearwardly and their locking flanges 88' disengaged from the lugs 80' of the racks 80. In other words, the adding racks 80 are in this manner initially released. They do not move because the detent bar 74 is yet maintaining the levers 75 in their normal position. However, as soon as the operator pulls the handle 38 forwardly, the lever 79 (see Fig. 12) will be tilted or rocked through the flexible connection 77—78 and such movement of the lever will correspondingly rock the arms 71 and raise the arms 69 which carry the detent bar 74. The moment the detent bar 74 is released, the springs 76 act on the levers 75 to pull the adding racks 80 downwardly and elevate the type carriers 95. When the keys 29 were depressed, as before stated, each key, of course, moved its coöperating indexing stop 90 into the path of the lug 80' of the adjacent rack 80 and when the adding racks were moved, the lugs 80' engaged with their selected index stops and in this manner the extent of movement of the rack 80 and the type carriers 95 was differentially controlled. For instance, if the first key of the units row is depressed, it will set in operative position the uppermost of the indexing stops 90. If the key 3 of the tens row is depressed, the third indexing stop 90 from the top of the series coacting with the tens keys will be moved into operative position. When the adding racks for the keys just mentioned are moved downwardly, the units rack will have one increment of movement, while the tens rack will have three increments of movement.

On the return movement of the handle 38 to its rearward position, the various racks 80 will be raised to assume their normal positions, during which movement the adding wheels or pinions 84 are operated, and the type carriers will also be returned to their normal positions, the impression means having previously acted upon the types adjusted for printing.

*Key lock and release means.*—Vertically arranged within the front portion of the key-board section are a plurality of pivoted locking plates 98, one of which is provided to coöperate with the superposed index stops of each row of keys, as shown most clearly in Fig. 13 of the drawings. The springs 99 are connected with the innermost portions of the locking plates 98 and normally tend to force the outer edge of said plates into locking coöperation with the adjacent stops 90, each of the latter having a lateral rounded catch 100. When the key 29 is depressed, its coacting index stop 90 is cammed outwardly in the manner above described until the catch 100 of said stop is engaged at the inner edge thereof by the adjacent locking plate 98. Should a second key 29 in the same row be depressed, purposely or otherwise, its index stop 90 will engage the locking plate 98 last referred to and release the first mentioned depressed key, permitting the latter to return to its normal position and the newly depressed key to be locked depressed. A flexible key-board is thus provided for the machine. Arranged to slide transversely of the several locking plates 98, is a key release bar 101, having the inwardly extending hooks 101' arranged to engage and impart pivotal movement simultaneously to all of the locking plates 98. The bar 101 is at the front extremity of the keyboard section and is operable by an "error" key 102, arranged at the right hand side of the key-board. As shown clearly in Fig. 16, the "error" key 102 is provided at its lower portion with a flange or cam 102' in an obvious manner. The cam 102' of the key 102 is arranged to engage a swinging release bail 104 pivoted to a shaft 105 and extending rearwardly from the front portion of the key-board section at the right hand side. The front leg of the bail 104 is adapted to engage the right hand end of the release bar 101 and thus, it will be apparent that, on depression of the "error" key 102, the bail 104 will be swung to the left, imparting longitudinal release movement to the bar 101 and operating all of the locking plates 98 which have assumed locking positions in respect to any of the index stops 90. The various keys 29 are, in the above manner, simultaneously released. In other words, and referring particularly to Figs. 3 and 16, depression of a key 29 cams forward its predetermined indexing stop 90, the locking bar 88 coöperative with said key being simultaneously cammed rearward, as long as the key 29 is held depressed by the previously mentioned locking plate 98 (see Fig. 13) one of these plates being provided for each row of keys or each row of index stops. Since the index plate 90 is held forward by the engagement of the predetermined locking plate 98 with a projection 100 on the edge of said stop, obviously the key 29 cannot return to normal until the member 98 is disengaged from the projection 100 of the adjusted index stop 90. This disengagement is effected through the medium of the release bar 101, said bar engaging all of the lock plates 98 and being tripped or moved leftward looking toward the keyboard from the front, by the rocking of the release bail 104 the front leg of which bail engages directly with the right hand end of the release bar 101 so that inward movement of the bail will shift said bar 101 longitudinally and thereby tilt all of the plates 98 whether they have been engaged with projections 100, out of engagement with said projections thus permitting the stops 90 and the keys 29 which have been depressed to normalize. It is necessary, of course, that the bail 104 shall be operated from the main actuator 38 in order that, upon the completion of an operation of the machine by said actuator, the keys 29 may be restored to their normal position. With the above in view, the uppermost arm 72' of the lever 72, shown in Fig. 14, has an inwardly extending stud 72ª thereon for coöperation with a release lever 106 pivotally mounted on the frame at 107 and carrying at its upper end a pawl 108. A spring 109 tends to pull the lever 106 rearwardly in a position in which the lever normally rests against the stud 72ª. On initial movement of the actuating handle 38 the arm 72' of the lever 72 moves rearwardly, permitting the spring 109 to carry the release lever 106 in the same direction, the pawl 108 riding over the pin 104' on the inner end or leg of the bail 104. On the return stroke of the handle 38, the stud 72ª forces the release lever 106 forwardly and the pawl 108 by a sort of cam action against the pin 104' of the bail 104, swings said bail to the left, and imparts movement to the release bar 101, thereby permitting the keys 29 depressed to perform a transaction, to return to their uppermost positions. The pawl 108 has a stop 108' that abuts with the laterally curved upper end of the lever 106 so that said pawl will not yield on the forward movement of the lever, insuring a proper movement of the release bail 104.

While describing the release bail 104 it may be noted that said part has an additional function in reference to its coöperation with the "total" and "sub-total" keys 110 and 111, respectively. The keys 110 and 111 are mounted in the frame of the keyboard in a manner similar to the "error" key 102, being also guided by attaching and guiding pins 103. The said keys 102, 110 and 111 have springs 112 connected therewith to hold them upwardly retracted. The key 110 has a lateral locking flange 110' and the key 111 has a similar flange 111', said flanges being adapted to be engaged by the bail 104 when either of the "total" and "sub-total" keys is depressed, whereby to lock said key in such position. A stud 110ª on the key 110 and a stud 111ª on the key 111 project laterally and are adapted to engage respectively, cams 113 and 114 which are formed on a shifting bar 115 which is arranged transversely in respect to the keys 110 and 111. The bar 115 has a pin and slot connection 116 at its front end with the frame of the machine and at its rear end, said bar is pivotally connected with a side of a swinging bail 117. The bail 117 has the sides 117' and the cross piece of the bail is interlocked, as shown in Fig. 3, with the several locking bars 88 for the keys 29. Having in view the foregoing, it is obvious that by depressing either of the keys 110 and 111, the shifting bar 115 will be moved rearwardly, swinging the bail 117 in a corresponding direction and simultaneously moving rearward all of the locking bars 88 until shoulders 88ª of said bars engage beneath the lateral pins 89. In the above manner therefore, the keyboard including the amount keys 29 is locked against operation whenever the "total" or "sub-total" key is depressed to perform its usual function.

Still another special key, the "repeat" key, 118 is provided in the keyboard, is normally upraised by a spring 119, and is formed with a lateral arm 120 having a stud 120′. On depression of the key 118, the stud 120′ assumes a position abutting with the rear side of the release lever 106 so that when the handle 38 is operated to carry the arm 72′ of the lever 72 rearwardly, the release lever 106 cannot move to perform its usual release operation, whereupon the previous transaction set up on the machine will be repeated in a manner readily apparent.

*Accumulating and transfer mechanism.*— Referring particularly to Figs. 4 to 8, inclusive, the accumulating mechanism of the machine consists of the frame 87 which is pivotally supported by upright rocker arms 121 carried by a rock shaft 122. The frame 87 consists of a number of upright division plates 123 united by suitable tie members. Between the division plates 123 are mounted the adding wheels and pinions 84 hereinbefore referred to. The end plates of the accumulator frame 87 have forwardly projecting extensions 87′ at their upper extremities, which latter are forked so as to receive the transverse guide bar 124. By rocking the arms 121 inwardly or outwardly, engagement and disengagement of the adding pinions or wheels with the adding racks 80 may be effected, and at the outer sides of the adding wheels are arranged the carrying racks 125, the same being provided with teeth at their upper ends and said ends being also bifurcated to be engaged with and guided by the guide bar 124. At its lower end, each carrying rack 125 is bifurcated to engage over a stud on the front end of a carrying lever 126. The carrying or transfer mechanism includes primarily the carrying racks 125, their carrying levers 126, tripping and totaling pawls 127, each of which is mounted between adjacent division plates on the frame 87, and latches 128 pivotally mounted between the adjacent pairs of guide plates 82. The carrying levers 126 are pivoted between their ends upon a shaft 129 located just beneath the shaft 122. A detent bar 130 is arranged transversely of the key-board, just beneath the carrying racks 125 and is supported by a pair of arms 131, which are rigidly mounted on the shaft 129 before mentioned. Said shaft 129 is adapted to move the detent bar 130 by an arm 132, shown in Figs. 25 to 28, inclusive, and in conjunction with means to be hereinafter more fully described.

Exemplifying the general operation of the transfer mechanism, it will be noted that if the number "99" is set up on the keyboard, the units and tens adding wheels will rotate until the dials thereof show "99" at the sight opening 85 of the machine. No transfer has yet taken place but the carrying cam 133 on the units adding wheel is advanced nine spaces and occupies a position ready to trip the pawl 127. If the number "7" is set up on the key-board and the machine operated, the said carrying cam 133 will depress the pawl 127, as shown in Fig. 5, said pawl 127, through its lateral extension 127′, tripping the latch 128 and causing the foot 128′ of said latch to be disengaged from the tens carrying lever 131. Ordinarily, were no means provided to prevent such action, the tens carrying rack would now descend one space. However, the adding pinions at this period of the operation are in engagement with the adding racks 80 and not with the carrying racks 125 so the carrying operation must be temporarily delayed, for which purpose the detent bar 130, previously referred to, is provided, the same at this point in the operation of the parts assuming the position shown in Fig. 5, and holding the carrying racks 125 in their uppermost positions. As will be seen from Fig. 7, the stud on the front end of the carrying lever 126 is normally at the upper end of the slot or bifurcation in the lower end of the carrying rack 125 and a spring 125ª connects the parts 125 and 126 and is sufficiently strong to cause a gravitating movement, but weaker in tension than a second spring 134 which connects the inner end of the carrying lever with a tie plate 135. In the example cited above, as soon as the carrying cam 133 trips the pawl 127, the stud of the carrying lever takes up the lost motion in the carrying rack and the stop 131′ of the carrying lever moves in front of the stud 128ª of the latch foot 128′. The parts are now ready to complete the carry when the detent bar 130 is lowered to assume the position shown in Fig. 6, such movement permitting the tens carrying rack 125 to descend a distance equal to the length of one tooth, thereby rotating the tens adding wheel one tooth to cause the latter to transfer from "9" to "0" on the dial at the sight opening 85. Of course, in the above operation, the tens wheel in transferring will trip the carrying rack of the hundreds wheel, allowing the pinion of the latter to advance one tooth—with this difference that in the second case, the carry or transfer will not be held up since the transfer has taken place after the pinions have engaged their carrying racks. Fig. 6 shows the last described action and the completion of the transfer operation will display the indication "106" at the sight opening 85.

*The general control mechanism.*—The coöperation of the adding racks 80 with the adding wheels or pinions 84 is closely analogous to the equivalent action of those adding machines of the same type as the present improvements. Thus in relation to the rocking of the frame of the accumulating devices to cause engagement of said devices with the adding racks, for operations of addition, totaling, and sub-totaling, the time of such coöperation is different, being that ordinarily employed in this special type of adding mechanism. For the purpose of addition, the adding racks 80 are engaged with the adding pinions as said racks start on their upward movement. For the sub-totaling operation, the racks 80 are engaged with the adding pinions 84, both on the descending and ascending movement of said racks, while for totalizing, when the machine is, of course, cleared, the adding racks are engaged with the pinions 84 at the outstart of the downward movement of said racks.

The control means for the above operations is clearly illustrated in Figs. 11 and 12, wherein it will be observed that the rock shaft 122 carrying the accumulating section has an operating arm 136 which is connected by a link 137 with an approximately triangular-shaped controlling lever 138. The uppermost arm of said lever 138 is pivotally attached to the link 137 and the two lowermost arms of said lever designated 138′ and 138″ are hook-shaped and provided with cams 139. The lever 138 is pivoted at 140 and has lateral studs 141 and 142 projecting therefrom for coöperation under predetermined conditions with a wipe pawl 143, which is pivotally mounted at the upper end of the arm 72′ of the lever 79. Engaging the rear end of the lever 138 is a detent 144 maintained in such engagement normally by a spring 145 to thereby hold the control lever 138 against displacement during the normal operation of the machine. A stud 146 on the lower end of the detent 144 is adapted to ride along the upper surface of a lateral arm 79′ of said lever 79, locking the accumulating section against displacement during such coöperation.

As the machine operates in adding, it will be apparent that upon the forward stroke of the handle 38, the wipe pawl 143 will be carried rearwardly with the arm 72′, of the lever 79, and a roller 147 on the arm 72′ will engage the cam surface 139 of the arm 138″, thereby tilting the control lever 138 and rocking the tilting arm 136 to the rear. The movement of the arm 136 carries the accumulating wheels or pinions into mesh with the racks 80 and such meshing relation is maintained until the handle 38 returns to its normal position, restoring the arm 72′ to its corresponding position and rocking the control lever 138 so as to assume its normal position through engagement of the roller 147 with the cam 139 of the arm 138′.

The "total" key 110 has a stud 148 adapted to engage the front end of a lever 149, the rear end of which lever has a stop 150 arranged adjacent to the arm 138″ of the control lever 138. Intermediate its ends, the lever 149 has a lateral stud 151 adapted to engage a cam extension 152 upon an auxiliary lever 153 pivoted between its ends just below the lever 149. The front end of the lever 153 is engageable by a stud 154ᵃ near the lower end of the "sub-total" key 11, and the rear end of the auxiliary lever 153 is proximate to the arm 138′ of the controlling lever 138 and adapted to constitute a stop having a function equivalent to that of the stop 150. Normally the springs 154 and 155 coöperate with the levers 149 and 153, respectively, to hold the latter in their normal positions. In the totaling operation, the "total" key 110 will be depressed and thereby depresses the front ends of the levers 149 and 153. This action raises the rear ends of the levers aforesaid and permits movement of the pawl under the influence of the spring 156 so that as the handle 38 is drawn forwardly carrying the lever arm 72′ rearwardly the pawl 143, which is double-acting, will engage the stud 141, tilting the accumulating devices 84 into mesh with the racks 80. Furthermore, as the lever arm 72 starts to return to its normal position, while the handle 38 is doing the same, the pawl 143 is free to engage the stud 142 and tilt the accumulating devices out of mesh with respect to the racks 80. By this means, the accumulating devices are engaged with the racks only on the downward movement of the latter. In obtaining a sub-total, since depression of the key 111 depresses only the lever 153, the pawl 143 will act to rock the accumulating devices into engagement with the racks 80 as the lever arm 72′ moves rearwardly. Since the stop 150 has not been raised, the pawl 143 will not coact with the stud 142 and therefore the accumulating devices and racks aforesaid will remain in engagement until the operation of the machine is completed, as is necessary in obtaining a sub-total.

*Transfer control mechanism.*—The parts of this mechanism are shown primarily in Figs. 25 to 28, inclusive, and comprise a depending pivoted lever 157 connected at its lower end by a link 158 with the arm 132 of the shaft 129 which carries the detent bar 130. The arm 132 is adapted to assume three different positions in restoring the transfer or carry-over mechanism, said positions being illustrated in Figs. 25, 27 and 28. In Fig. 25, the parts are shown in the positions occupied thereby when the machine is at rest after the operation. Fig. 27 shows the parts in their relation when the handle 38 is at the end of its forward stroke, the carrying racks 125 being raised above their normal positions in order to enable the part 128ᵃ of the foot of the latch 128 to engage over the adjacent end of the carrying lever 131. In Fig. 28, the parts are in the positions taken thereby immediately after the handle 38 starts upon its return stroke, at which time the carrying racks have again become meshed with the adding pinions or wheels 84, the normal condition.

Loosely mounted upon the shaft 72 is a latch 159, the rear end of which has a catch 159' to engage a lateral pin 160 on the depending lever 157. The shaft 72 aforesaid also carries for movement therewith the full-stroke sector 161, coacting with the full stroke pawl 162 in a well-known manner, and a lateral stud 159'' on the front end of the latch 159 is adapted to be engaged by the front edge of the sector 161. The rear edge of the sector 161 is capable of engagement with a stud 163 carried by the forward extension of the lever 157. A spring 164 connects the parts 158 and 159 and normally tends to hold the latch 159 with its stud 159'' engaging with the sector 161, as shown in Fig. 25.

It will be apparent that as the handle 38 is drawn forwardly, the sector 161 moves rearwardly until it engages with the stud 163 of the lever 157, whereupon the several carrying racks 125 and carrying levers 131 are restored. When the sector 161 moves the lever 157 rearwardly, the catch 159' of the latch 159 engages over the pin or stud 160 and prevents movement of the carrying racks, thereby retarding the carrying operation until the return movement of the handle 38, or until said handle reaches the extreme end of its return stroke, at which time the latch stud 159'' will be tripped by the sector 161, raises the catch 159' and permitting the spring 164 attached to the link 158 to pull upon said link, rock the arms 132 and lower the detent bar 130. Said lowering movement of the detent bar 130 permits a similar movement of the carrying racks 125 and carrying or transfer action of the same if the accumulating devices are ready for such transfer.

At the upper end the sector 161 carries a stud 165 which engages with the bifurcated lower end 166' of a lever 166 which coöperates in a peculiar manner with the printing mechanism as will now be more fully described.

*Printing mechanism.*—The type carriers of the printing mechanism have heretofore been referred to as consisting of vertically movable type bars 95 arranged in the rear portion of the key-board section of the machine, said bars being supplied at their upper ends with the spring retracted type members 95', each type member carrying a type face at one end and having its other end arranged to be impinged by suitable impression means in the form of a type hammer. The type faces of the type members 95' are numbered from 1 to 9 consecutively and the uppermost type member has a cipher indication, as shown in Fig. 21. The printing mechanism is best shown in Figs. 3, and 19 to 24, inclusive, and each type bar is provided at its upper portion with an incasing plate 167 interlocked at its upper extremity as shown at 167', with lugs 167'' on the upper extremity of the type bar, the parts 95 and 167 being attached together by screws or other fastenings, as shown at 168. Flanges on the edges of the type bar 95 are cut out to form guide portions 169 for the type members 95' and the springs 170 coacting with the members 95' are housed between the incasing plate 167 and the body of the type bar 95, as shown most clearly in Fig. 22 of the drawings.

A set of type bars 95 of a number corresponding with the number of rows of amount keys 29 of the keyboard is provided and with said type bars is associated a set of hammers 171 for striking the type members 95', a set of hammer drivers 172, each connected with the adjacent hammer, a set of catches 173 of hook-like form for normally restraining the hammers under tension, and a set of springs 174 connected with the hammer drivers.

The above mentioned parts are primarily supported in a frame consisting of sides 175 and 176, the lower portions of which are connected by tie rods 177 and 178. Said frame for the printing devices is rockably mounted on a shaft 179 and the left side 175 of the frame has an upwardly extending arm 180 above the shaft 179. The rod 177 constitutes an axis for the various catches 173 which are adapted to engage over lugs 181 on the coacting hammer drivers 172. The rod 178 has connected thereto a set of springs 182 which are attached also to the catches 173 and normally tend to force the latter into engagement with the lugs 181. Each hammer 171 has a head at its upper end to impinge with the adjacent end of any type member 95' of the coöperating type carrier or bar 95 and at its lower end the hammer is loosely pivoted upon the shaft 179. Each hammer driver 172 is also pivoted on the shaft 179, the lower end of the driver being connected with its spring 174, the upper end of the driver having ears 172' between which the body of the coöperating hammer is loosely engaged, and the intermediate portion of said part 172 being adapted to abut with the stop bar 183. There is therefore some lost motion between the ears 172' of the driver 172 and the hammer 171 engaged thereby, to provide for the rebound of the hammers after impact with the type members 95', the liability of blurring being thus obviated. The arm 180 of the hammer supporting frame is connected by a driving link 184 with an arm 185 of a rock shaft 186, to which shaft 186 the lever 166 before referred to is connected. A dash pot 187 or equivalent retarding device is arranged at the left of the printing mechanism, being supported upon a cross rod 188 of the frame of the machine, the plunger rod of the dash pot being attached at its upper end to a cross bar 189 mounted on rocker arms 190 attached to the shaft 186. A suitable platen 216 is arranged to coöperate with the printing members 95' of the type carriers 95 and the tails or lower ends of the catches 173 are split to provide laterally extending stops 192, each projecting in front of the tail portion of the next adjacent catch to the left, whereby the cipher type members 95' of type carriers 95 not operated by adjustment of the keys 29, will be printed on operation of the impression means.

With the above description in view, and bearing in mind that each type carrier 95 has an abutment 95ᵃ at its front edge to be engaged by the tails of the catches 173 when the latter are rocked with the hammer frame rearwardly, and when the type carriers are not in their zero positions, the operation of the mechanism will be clearly understood from the following:

During the initial movement of the handle 38, those type carriers 95 which are indexed for any number above zero, will be elevated to the printing point, after which the frame 175—176 will be rocked slightly rearward until the tails of predetermined catches 173 engage with the abutments 95ᵃ of the elevated type carriers. Such engagement will tilt the catches 173 from the studs 181, thereby releasing the hammer drivers 172 of such catches and permitting the hammers 171 of said drivers to be fired, or operated against the previously adjusted printing members 95'. The provision of the dash pot retarder 187 governs the speed of the machine, preventing scattering of the type and violent manipulation of the handle 38. When the frame 175—176 of the printing devices is rocked back to its normal position, the catches 173 will be reëngaged with the studs 181 of the hammer drivers 172 and locked until another transaction of the machine is performed.

As shown in Figs. 19, 20, 21ᵃ and 22, a duplicate printing mechanism is provided and consists of auxiliary type carriers 95ˣ, each of which is connected with the corresponding one of the main type carriers 95. To establish such connection, a plurality of gear shafts 193 are provided in superposed relation upon a suitable frame 194. There are two gears 195 on each shaft 193, said gears meshing with gear teeth 196 on the rear edges of the corresponding type bars 95 and 95ˣ. That is to say, the gears 195 of the lowermost shaft engage with the units type carriers 95 and 95ˣ of the main and auxiliary printing mechanisms. The gears of the next shaft 193 engage with the teeth on the rear edges of corresponding tens type bars of the two printing mechanisms, and so on. By reason of the intergearing of the type carriers or bars of the two printing mechanisms, whenever one of the type carriers 95 is indexed at a predetermined adjustment on movement to such adjustment, its corresponding type carriers 95ˣ will be simultaneously adjusted. The other printing instrumentalities coöperating with the type carriers 95ˣ are identical with those coöperating with the type carriers 95 so the operations of the main and auxiliary printing mechanisms are simultaneous and capable of making a list or record in duplicate, which is often desirable for the printing of a check or slip placed in the machine and for printing a recording strip, which is constantly passing through the machine.

As usual in these machines a suitable inking ribbon 197 is fed between the printing members and the work, and preferably, as shown in Fig. 2, said ribbon passes around the spools 198 and 199. Said spools have toothed wheels, the teeth of which are engaged by feeding and reversing pawls 202' and 203', carried respectively by levers 202 and 203. The levers 202 and 203 are connected by a plate 204 which is adapted to be reciprocated through connections, not shown, intermediate the plate and the main actuator. As the details of the ribbon feeding mechanism do not constitute a part of the present invention, they are not herein described.

*Platen feed mechanism.*—The mechanism for feeding the roller platen 216 is shown clearly in Fig. 22 and certain parts are illustrated in Figs. 7 and 21 also. The platen 216 is arranged above the paper spool 217 which carries the roll of paper 218 that constitutes the recording strip incidentally referred to hereinbefore. Mounted upon the axis 219 of the spool is an angle lever 220, the lower arm of which is formed with a cam 221 arranged to be engaged by the arm 180 which rocks with the hammer frame. The other arm of the lever 220 is approximately vertical and carries at its upper end a roller 222 which operates in a cam slot 223 of a feed lever 224 pivoted to the axis of the platen 216. Pivoted to the lower outer portion of the feed lever 224 is a spring actuated feeding pawl 225 adapted to engage at one end with a toothed disk attached to an end of the platen, the other end or tail of the pawl being engageable by a lateral pin 226 on the vertical arm of the angle lever 220. A pivoted pressure finger 227 is mounted above the lever 220 and a spring 228 holds said lever in engagement with a star-wheel 229 on the right hand end of the platen 216, the part 227 preventing over-rotation of the platen. A feeding roll 230 coöperates with the platen and the recording strip 218 in the well-known manner and a lever 231 is arranged to be manipulated to release the feed roll from operative engagement with the strip 218 for adjustment of the latter or other purposes.

With the arrangement of parts in view as above set forth, it will be apparent that on the forward movement of the arm 180, the cam 222 moves downwardly, permitting the lever 220 to be tilted by the spring 232 connected therewith. Such movement of the lever 20 imparts upward movement to the feed lever 224 and the pawl 225 carried thereby, this action raising the pawl preliminary to engagement of the same with the next tooth of the feed disk 216' on the platen. The above operation takes place as the handle 38 moves forwardly and on the return stroke of the handle 38, the feed lever 224 is depressed, feeding the platen forward to a predetermined point and correspondingly feeding from the machine a section of the recording strip 218. The feeding of the platen being completed through the action of the lever 224, the final lowering movement of said lever causes engagement of the tail of the feeding pawl 225 with the pin 226, thereby tilting the pawl from engagement with the disk 216' and permitting the platen to be turned in either direction at the will of the operator.

*General operation of entire machine.—*
Before describing the complete operation of the invention, it should be noted that on the return stroke of the handle 38, the detent bar 74 picks up, so to speak, the levers 75 and restores the same, the adding racks 80, and type carriers 95 and 96, to their original positions. The "total" and "sub-total" keys are adapted to actuate the key release bail 104 when the former are depressed, to thereby throw out an item from the keyboard when either of said keys is operated. The cam slots 69' in the arms 69 are peculiarly formed at their rear and forward ends so that in the operation of the machine, the adding racks will be maintained stationary while the adding wheels or pinions are engaging or disengaging in respect thereto. After the keys 29 are depressed to set up a suitable amount to be added and listed by the machine, the handle 38 is pulled forward and during such initial movement, the indexed adding racks 80 move downwardly and the corresponding type carriers 95 move upwardly until said parts reach their differentially adjusted positions. Just prior to the final movement of the handle 38 completing its forward stroke, the hammer drivers are fired to complete the operation of the printing and listing mechanism. The ribbon feeding parts are also actuated at the proper time to feed the inking ribbon 197 to present a fresh portion thereof to the printing point of the type members and the platen feeding devices are correspondingly operated to perform their proper functions. At the time the hammers are fired, the adding wheels are drawn into engagement with the adding racks 80 and on the return movement or stroke of the handle 38, the several levers intermediate the adding racks and type carriers are restored to their normal positions and said adding wheels are rotated a predetermined number of teeth as controlled by the indexing mechanism of the keyboard. Of course, the full-stroke sector 161 compels complete operation of the machine once the operator has started to pull the handle forward.

Since the printing or listing mechanisms are provided in duplicate, one of said mechanisms will record transactions of the machine on a recording strip while the other is capable of listing said transactions upon a slip, check, or other member placed in the guide 233. Springs 248, shown in Fig. 3, are connected with the keys 29 and normally tend to restore said keys when released.

Having thus described the invention, what is claimed as new is:

1. In an adding machine, mechanism for accumulating items and totalizing the same, amount keys, indexing mechanism controlling differential action of said accumulating mechanism, and operable by the amount keys, and a single locking member operable by the amount keys to release the accumulating mechanism and independently movable to lock said amount keys from operation.

2. In a calculating machine, adding racks, amount keys for controlling differential movements of said racks, locking bars normally locking said adding racks from movement and operable by the amount keys to release the racks, and means for causing an abnormal movement of said locking bars to throw the same into locking coöperation with the amount keys, whereupon the latter will be prevented from actuation.

3. In an adding machine, the combination of mechanism for accumulating items and obtaining the total thereof, comprising adding racks, amount keys for controlling differential movements of said racks, locking bars normally locking said adding racks from movement and operable by the amount keys to release the racks, and a total key included in the accumulating mechanism and adapted to operate the locking bars independently of the operation of the latter by the amount keys, so as to cause said locking bars to lockingly coöperate with the amount keys for preventing actuation of the latter during the operation of taking a total.

4. In an adding machine, the combination of mechanism for accumulating items and obtaining the total thereof, comprising adding racks, amount keys for controlling differential movements of said racks, locking bars normally locking said adding racks from movement and operable by the amount keys to release the racks, the accumulating mechanism comprising a total key, and means intermediate said total key and the locking bars to impart to the latter movement independent of their movement by the amount keys to thereby cause said bars to lock the amount keys from actuation.

5. In an adding machine, accumulating mechanism comprising adding racks and wheels, amount keys, indexing stops operable by the amount keys to control differential movement of the racks, locking bars normally coöperating with the adding racks, means intermediate said bars and keys for shifting the bars to release the adding racks when an amount key is depressed, and means for imparting additional movement to the locking bars to engage the same directly with the keys and thereby prevent depression of the latter.

6. In an adding machine, accumulating mechanism comprising adding racks and wheels, amount keys, indexing stops operable by the amount keys to control differential movement of the racks, locking bars normally coöperating with the adding racks, means intermediate said bars and keys for shifting the bars to release the adding racks when an amount key is depressed, a total key, a swinging bail engaging the locking bars, and means intermediate said bail and the total key whereby on operation of the latter the bail will move the locking bars into a position preventing depression of any of the amount keys.

7. In an adding machine, the combination of accumulating mechanism comprising adding racks, a key-board comprising a plurality of rows of keys, each row associated with an adding rack, index stops intermediate the keys of each row and its adding rack, a locking bar for each row of keys normally locking the associated adding rack from movement, pins carried by the keys to engage and shift the adjacent locking bar to release its coacting adding rack, a total key, a shifting bar operable by said total key, a swinging bail engaging the several locking bars of the rows of keys, and a connection between said bail and the shifting bar aforesaid, whereby on depression of the total key, the locking bars will be moved to coöperate with the pins of the amount keys to prevent depression of the latter.

8. In an adding and listing machine, the combination of accumulating mechanism including adding racks, printing mechanism comprising type carriers, levers pivoted intermediate their ends and each operatively connected at its opposite ends with an adding rack and a type carrier, means for controlling differential movements of the racks and carriers, and a main actuator for the machine comprising a shaft constituting the axis of said levers, arms having longitudinal cam portions and supported by said shaft, a detent bar connecting said arms and engaging the levers to hold them in a predetermined position, springs connected with the levers to actuate them when released from the detent bar, a drive shaft, arms carried by said drive shaft, members on the last mentioned arms engaging the cam portions of the first mentioned arms, and a connection between the operating shaft and the drive shaft, substantially as described.

9. In an adding and listing machine, accumulating and listing mechanism for printing and accumulating items and printing the total thereof, amount keys, indexing mechanism controlling differential action of said accumulating and listening mechanisms, and operable by the amount keys, locking means operable by the amount keys to release the accumulating mechanism, said accumulating mechanism including a total key for causing said locking means to lock the amount keys from movement during the operation of taking the total, and locking and release means for the parts of the indexing mechanism comprising an automatically operating member for holding the total key in an operated position.

10. In an adding and listing machine, accumulating and listing mechanism for printing and accumulating items and printing the total thereof, amount keys, indexing mechanism controlling differential action of said accumulating and listing mechanisms, and operable by the amount keys, locking means operable by the amount keys to release the accumulating mechanism, said accumulating mechanism including a total key for causing said locking means to lock the amount keys from movement during the operation of taking the total, and locking and releasing means for the indexing mechanism including a release member operable incident to actuation of the total key to engage and hold the total key depressed.

11. In an adding and listing machine, accumulating and listing mechanisms for accumulating and printing items and taking totals thereof, indexing means coöperating with said mechanisms and comprising indexing stops, lock means coacting with the indexing stops to hold the latter in operated positions, a release member for said lock means, total keys to engage the release member and to be held depressed thereby, and means for automatically operating the release member to engage it with the total keys.

12. In an adding and listing machine, the combination of item listing, accumulating, and total printing mechanisms, indexing mechanism governing the action of the mechanisms above mentioned, amount keys coöperating with the indexing mechanism, locking devices for the indexing mechansm, a release bail, means intermediate said bail and the locking devices aforesaid to communicate movement of the bail to the locking devices, an actuator for said several mechanisms, means intermediate the actuator and release bail to cause operation of the latter on operation of the actuator, and other means to operate the release bail independently of the actuator.

13. In an adding and listing machine, the combination of item listing, accumulating, and total printing mechanisms, indexing mechanism governing the action of the mechanisms above mentioned, amount keys coöperating with the indexing mechanism, locking devices for the indexing mechanism, a release bail, means intermediate said bail and the locking devices aforesaid to communicate movement of the bail to the locking devices, an actuator for said several mechanisms, means intermediate the actuator and release bail to cause operation of the latter on operation of the actuator, and an error key to operate said release bail independently of the actuator.

14. In an adding and listing machine, the combination of item listing, accumulating, and total printing mechanisms, indexing mechanism governing the action of the mechanisms above mentioned, amount keys coöperating with the indexing mechanism, locking devices for the indexing mechanism, a release bail, means intermediate said bail and the locking devices aforesaid to communicate movement of the bail to the locking devices, an actuator for said several mechanisms, means intermediate the actuator and release bail to cause operation of the latter on operation of the actuator, an error key to operate said release bail independently of the actuator, and a special key for preventing operation of the release bail by the actuator.

15. In an adding and listing machine, the combination of item listing, accumulating, and total printing mechanisms, indexing mechanism governing the action of the mechanisms above mentioned, amount keys coöperating with the indexing mechanism, locking devices for the indexing mechanism, a release bail, means intermediate said bail and the locking devices aforesaid to communicate movement of the bail to the locking devices, an actuator for the several mechanisms, means intermediate the actuator and release bail to cause operation of the latter on operation of the actuator, an error key to operate said release bail independently of the actuator, and a special key for preventing operation of the release bail by the actuator, the total printing mechanism including total keys depressible preliminary to the taking of a total and having means to engage the release bail to hold said keys depressed.

16. In a machine of the class described, the combination of an actuator, a member movable with each operation of the actuator, and accumulating mechanism comprising a system of control levers governing the engagement of certain parts of said mechanism, said system of levers including a three-armed-lever, two of whose arms are formed with cams, and a part carried by the movable member above mentioned to engage the cams of said three-armed-lever to impart opposite tilting movements to said lever.

17. In a machine of the class described, the combination of an actuator, a member movable with each operation of the actuator, and accumulating mechanism comprising a system of control levers governing the engagement of certain parts of said mechanism, said system of levers including a three-armed-lever, two of whose arms are hook-shaped and formed with cams, and a roller carried by the movable member above mentioned and adapted to engage the cams aforesaid to impart opposite tilting movements to said lever.

18. In a machine of the class described, the combination of an actuator, a member movable with each operation of the actuator, accumulating mechanism comprising a system of control levers governing the engagement of certain parts of said mechanism, said system of levers including a three-armed-lever, two of whose arms are hook-shaped and formed with cams, and a roller carried by the movable member above mentioned and adapted to engage the cams aforesaid to impart opposite tilting movements to said lever, a wipe pawl carried also by said movable member, studs carried by the three-armed-lever on opposite sides of its axis and adapted to be engaged by said wipe pawl, total and sub-total control levers governing the coöperation of said wipe pawl with said studs, and total and sub-total keys adapted for operation of the total and sub-total levers, respectively.

19. In a machine of the class described, the combination of an actuator, a member movable with each operation of the actuator, accumulating mechanism comprising a system of control levers governing the engagement of certain parts of said mechanism, said system of levers including a three-armed-lever, two of whose arms are formed with cams, a part carried by the movable member above mentioned to engage the cams of said three-armed-lever to impart opposite tilting movements to said lever, a wipe pawl carried by the movable member above mentioned for coöperation with the three-armed-lever to tilt the latter in opposite directions, and a plurality of key-operated control levers governing the coaction of the wipe pawl with the three-armed-lever.

20. In a machine of the class described, the combination of accumulating mechanism including adding wheels and adding racks, means controlling relative movement of said parts whereby to engage and disengage the same comprising a three-armed-lever, an actuator, an operating lever connected with the actuator for movement thereby, means intermediate said operating lever and the three-armed-lever, to cause movement of the latter under normal conditions during operation of the actuator, a wipe pawl operable by said operating lever to operate the three-armed-lever for totalizing purposes, total and sub-total keys, and levers intermediate said keys and the wipe pawl governing its coaction with the three-armed-lever.

21. In a machine of the class described, the combination of accumulating mechanism including adding wheels and adding racks, means controlling relative movement of said parts whereby to engage and disengage the same comprising a three-armed-lever, an actuator, an operating lever connected with the actuator for movement thereby, means intermediate said operating levers and the three-armed-lever to cause movement of the latter under normal conditions during the operation of the actuator, a wipe pawl operable by said operating lever to operate the three-armed-lever for totalizing purposes, total and sub-total keys, levers intermediate said keys and the wipe pawl governing the coaction with the three-armed-lever, and means intermediate the levers last mentioned whereby both of them will be operated on actuation of one of the keys.

22. In a machine of the class described, the combination of accumulating mechanism comprising adding wheels, a carrier therefor, a shaft supporting said carrier, adding racks engageable with said wheels, and means governing the engagement of the adding racks and wheels including a three-armed-lever, a connection between one of the arms of said lever and said shaft, the other arms of the lever having cams, an operating lever having a member engageable with the cams aforesaid to impart tilting movement to the three-armed-lever under normal conditions, a wipe pawl carried by the operating lever aforesaid to cause tilting movement of the three-armed-lever under abnormal conditions for totalizing purposes, and a plurality of total keys governing the coöperation of the wipe pawl with the three-armed-lever.

23. In a machine of the class described, the combination of accumulating mechanism comprising adding wheels, a carrier therefor, a shaft supporting said carrier, adding racks engageable with said wheels, and means governing the engagement of the adding racks and wheels including a three-armed-lever, a connection between one of the arms of said lever and said shaft, the other arms of the lever having cams, an operating lever having a member engageable with the cams aforesaid to impart tilting movement to the three-armed-lever under normal conditions, a wipe pawl carried by the operating lever aforesaid to cause tilting movement of the three-armed-lever under abnormal conditions for totalizing purposes, total and sub-total keys, and control levers intermediate said keys and the wipe pawl having portions adjacent to opposite arms of the three-armed-lever to directly engage the wipe pawl and govern the tilting of the three-armed-lever thereby.

24. In a machine of the class described, the combination of accumulating mechanism comprising adding wheels, a carrier therefor, a shaft supporting said carrier, adding racks engageable with said wheels, and means governing the engagement of the adding racks and wheels including a three-armed-lever, a connection between one of the arms of said lever and said shaft, the other arms of the lever having cams, an operating lever having a member engageable with the cams aforesaid to impart tilting movement to the three-armed-lever under normal conditions, a wipe pawl carried by the operating lever aforesaid to cause tilting movement of the three-armed-lever under abnormal conditions for totalizing purposes, total and sub-total keys, levers operable at one end by said keys and having their other ends terminating at opposite sides of the pivotal axis of the three-armed-lever in the path of movement of the wipe pawl, studs on the three-armed-lever engageable by the wipe pawl according to the adjustment of the total and sub-total keys, and means intermediate the levers whereby their simultaneous movement may be effected by operating one of the keys.

25. In a machine of the class described, the combination of adding wheels, transfer and adding racks, an actuator controlling the operation of the adding racks, transfer devices intermediate the adding wheels and the transfer racks comprising cams on the adding wheels, pawls operable by said cams, latches operable by the pawls, transfer levers pivoted between their ends and coacting at one end with the latches and at their other ends with the transfer racks, and a delayed-movement-connection between the actuator and the transfer racks.

26. In a machine of the class described, the combination of adding wheels, transfer and adding racks, an actuator controlling the operation of the adding racks, transfer devices intermediate the adding wheels and the transfer racks comprising cams on the adding wheels, pawls operable by said cams, latches operable by the pawls, transfer levers intermediate the latches and the transfer racks, springs connecting the transfer levers with the transfer racks, other springs connecting the transfer levers with the latches aforesaid, and means coöperative with the actuator and the transfer racks to control the time of movement of the latter as influenced by their connections with the transfer devices.

27. In a machine of the class described, the combination of adding wheels, transfer and adding racks, an actuator controlling the operation of the adding racks, transfer devices intermediate the adding wheels and the transfer racks comprising cams on the adding wheels, pawls operable by said cams, latches operable by the pawls, transfer levers intermediate the latches and the transfer racks, a detent bar, a lever connected therewith, and means intermediate the actuator and the last mentioned lever to cause engagement of the detent bar with the several transfer racks to prevent operation of the latter until a predetermined time during the movement of the actuator.

28. In an adding and listing machine, the combination with controlling instrumentalities, of adding mechanism including adding racks, printing mechanism including type carriers, guiding means adapted to support said racks and carriers for sliding movement, and levers common to the racks and carriers for operating the same.

29. In an adding and listing machine, the combination with controlling instrumentalities, of operating levers, adding mechanism including adding racks adjacent to corresponding ends of said levers, printing mechanism including type carriers situated adjacent to opposite corresponding ends of said levers, guiding members engaging said adding racks and type carriers adjacent to their upper and lower ends and compelling sliding movement of said parts when actuated, and connections intermediate the ends of the said operating levers and the adding racks and type carriers whereby the last mentioned parts may be operated incident to the movement of the levers.

30. In an adding and listing machine, the combination with a plurality of relatively horizontally disposed operating levers, of adding mechanism including adding racks movable rectilinearly of said levers and operatively connected with the latter, printing mechanism including type carriers operating rectilinearly with respect to said levers and also connected with the levers, and guiding means engaging the racks of the type carriers to cause the same to slide in straight paths of movement.

31. In an adding and listing machine, the combination with a plurality of relatively horizontally disposed operating levers, of adding mechanism including adding racks movable rectilinearly of said levers and operatively connected with the latter, printing mechanism including type carriers operating rectilinearly with respect to said levers and also connected with the levers, and guiding means for the racks and carriers comprising horizontally disposed guiding members coöperating with the racks and carriers.

32. In an adding and listing machine, the combination with a plurality of relatively horizontally disposed operating levers, of adding mechanism including adding racks movable rectilinearly of said levers and operatively connected with the latter, printing mechanism including type carriers operating rectilinearly with respect to said levers and also connected with the levers, guiding means for said type carriers including superposed guide rods, the type carriers being provided with slots adjacent to their opposite ends receiving said guide rods and compelling accurate sliding movement of the carriers, and guiding means for the adding racks to compel accurate sliding movement of the latter also.

In testimony whereof, I affix my signature in the presence of two witnesses.

NELSON WHITE.

Witnesses:
 GEO. TUCK,
 FRANK MUNIFEE.

Corrections in Letters Patent No. 1,192,721.

It is hereby certified that in Letters Patent No. 1,192,721, granted July 25, 1916, upon the application of Nelson White, of Portland, Oregon, for an improvement in "Adding and Listing Machines," errors appear in the printed specification requiring correction as follows: Page 10, lines 13-14, claim 3, strike out the words "included in the accumulating mechanism and"; same page, lines 28-29, claim 4, strike out the words "the accumulating mechanism comprising"; and that the said Letters Patent should be read with these corrections therein that the same may conform to the record of the case in the Patent Office.

Signed and sealed this 5th day of September, A. D., 1916.

[SEAL.]

F. W. H. CLAY,
*Acting Commissioner of Patents.*

Cl. 235—60.